(12) United States Patent
Takezawa et al.

(10) Patent No.: US 10,794,520 B2
(45) Date of Patent: Oct. 6, 2020

(54) FLUID SUPPLY APPARATUS

(71) Applicant: TATSUNO CORPORATION, Tokyo (JP)

(72) Inventors: Masahiro Takezawa, Tokyo (JP); Kanan Matsuda, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 0 days.

(21) Appl. No.: 16/450,429

(22) Filed: Jun. 24, 2019

(65) Prior Publication Data

US 2020/0003349 A1  Jan. 2, 2020

(30) Foreign Application Priority Data

Jul. 2, 2018  (JP) ................. 2018-125965

(51) Int. Cl.
*F16L 35/00* (2006.01)
*F16L 37/084* (2006.01)
*F17C 5/06* (2006.01)

(52) U.S. Cl.
CPC .......... *F16L 35/005* (2013.01); *F16L 37/084* (2013.01); *F17C 5/06* (2013.01); *F16L 2201/20* (2013.01)

(58) Field of Classification Search
CPC ... F16L 35/005; F16L 37/084; F16L 2201/20; F16L 55/10007; F16L 35/00; F16L 55/1007; F17C 5/06; F17C 2250/0478; F17C 2225/0123; F17C 2205/0376; F17C 2205/0364; F17C 2223/0123; F17C 13/12;

(Continued)

(56) References Cited

U.S. PATENT DOCUMENTS 4,269,226 A * 5/1981 Allread .................... F16L 37/23
  137/614
4,863,397 A * 9/1989 Hatch, Jr. ................ B67D 7/32
  439/475

(Continued)

FOREIGN PATENT DOCUMENTS

FR  3009295 A1  2/2015
GB  2485832 A   5/2012

(Continued)

OTHER PUBLICATIONS

JP-2004353821-A English Translation of Specification (Year: 2020).*
European Search Report for EP 19 18 3517, dated Dec. 20, 2019.

*Primary Examiner* — Timothy P. Kelly
*Assistant Examiner* — Stephanie A Shrieves
(74) *Attorney, Agent, or Firm* — Stetina Brunda Garred and Brucker; Mark B. Garred

(57) ABSTRACT

To provide a fluid supply apparatus capable of preventing inconveniences cause by cut of a signal line when a filling hose is separated through an emergency separation pipe joint. The fluid supply apparatus (100: fluid supply apparatus for supplying fluid such as hydrogen gas and gasoline) includes a supply system for transporting fluid such as hydrogen gas and gasoline in a housing main body while measuring flow rate of the fluid; a control mechanism for controlling the supply system; a hose (2) introduced from the supply system and having a nozzle (1) at an end thereof; and a signal line (3) along the hose (2), wherein the signal line (3) is detachable.

6 Claims, 7 Drawing Sheets

(58) Field of Classification Search
CPC .............. F17C 5/007; F17C 2270/0139; F17C 2260/042; F17C 2250/0636; F17C 2250/036; F17C 2221/012; F17C 2225/036; F17C 2223/036; F17C 5/00; B67D 7/06; B67D 7/425; B67D 7/32; B67D 7/22; B67D 7/08; B67D 7/04; B67D 7/3218; F02D 19/027
USPC ........................................................ 141/382
See application file for complete search history.

(56) References Cited

U.S. PATENT DOCUMENTS

| | | | |
|---|---|---|---|
| 6,334,474 B1* | 1/2002 | Rababy | B67D 7/3218 137/68.14 |
| 2006/0068637 A1* | 3/2006 | Meleck | H01R 13/6271 439/606 |
| 2010/0089486 A1* | 4/2010 | Koeninger | B67D 7/3218 141/2 |
| 2013/0014854 A1* | 1/2013 | Mori | F17O 5/007 141/1 |
| 2013/0025698 A1* | 1/2013 | Safi-Samghabadi | B67D 7/3218 137/68.18 |

FOREIGN PATENT DOCUMENTS

| | | | |
|---|---|---|---|
| JP | 2004293777 A | | 10/2004 |
| JP | 2004353821 A | * | 12/2004 |

* cited by examiner

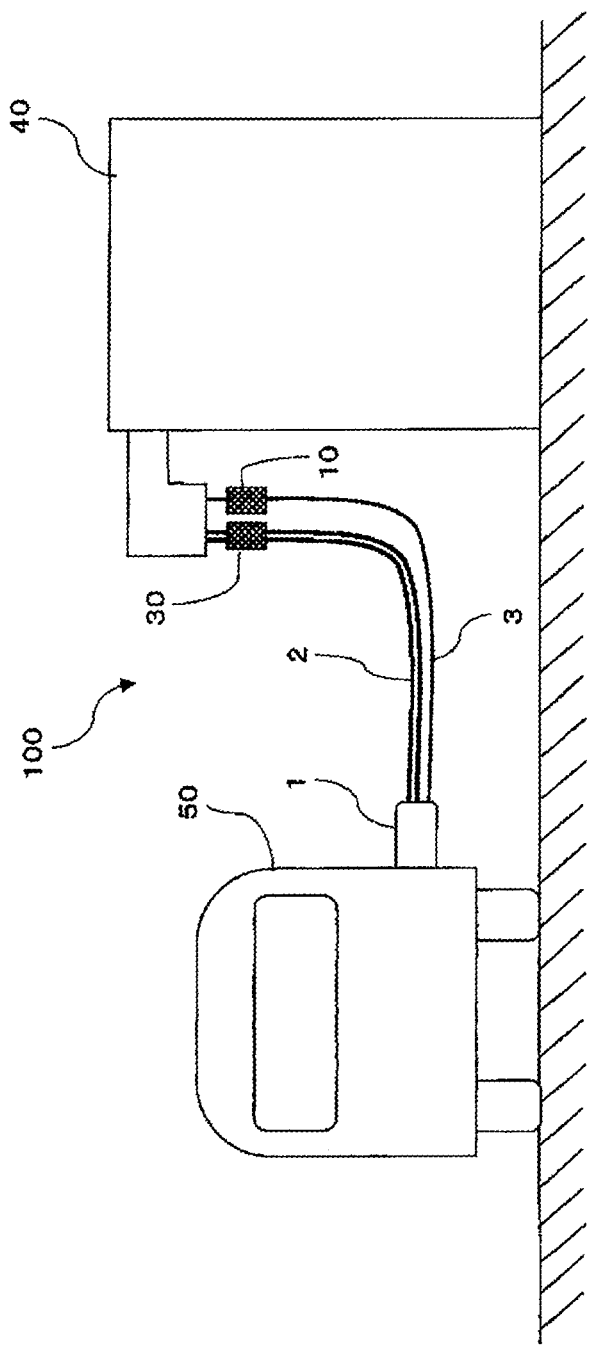

[Fig. 2]
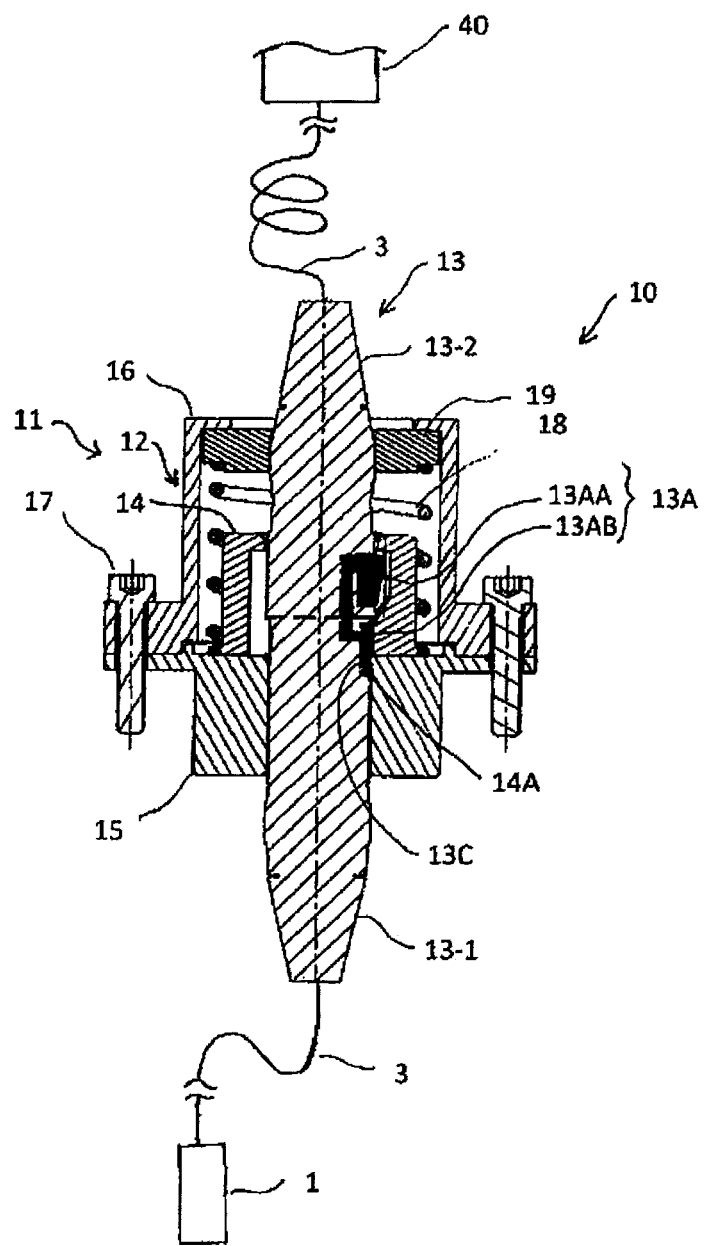

[Fig. 3]
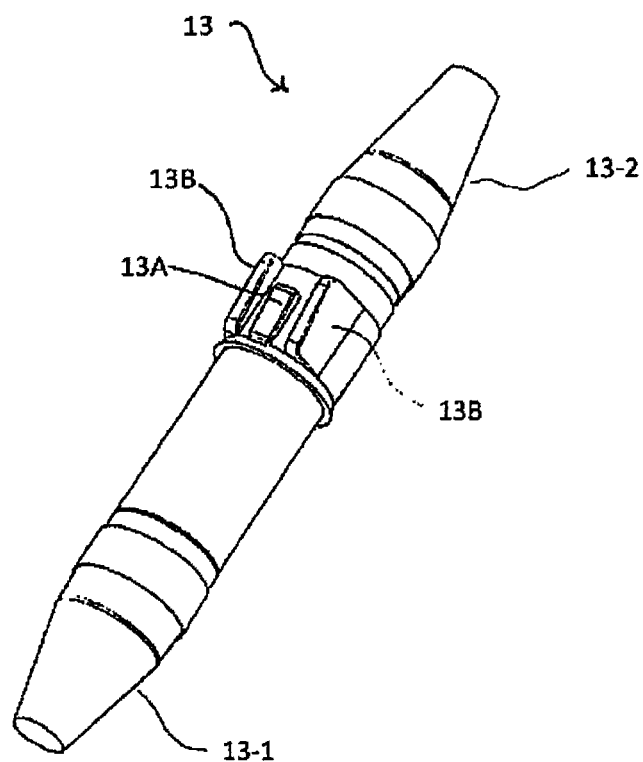
[Fig. 4]
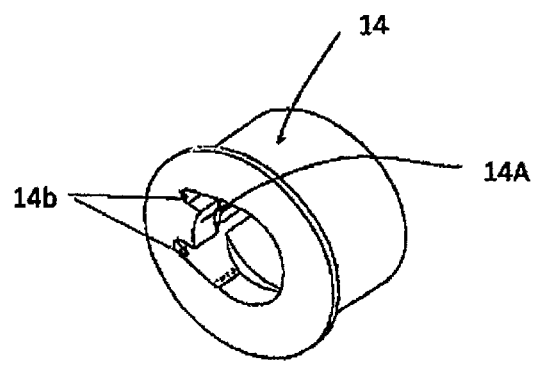

[Fig. 5]
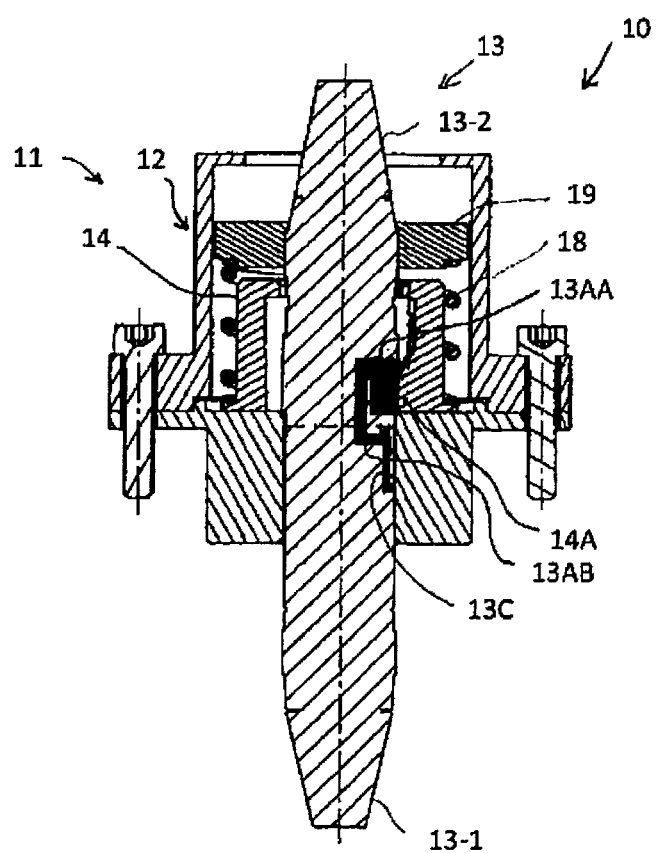

[Fig. 6]
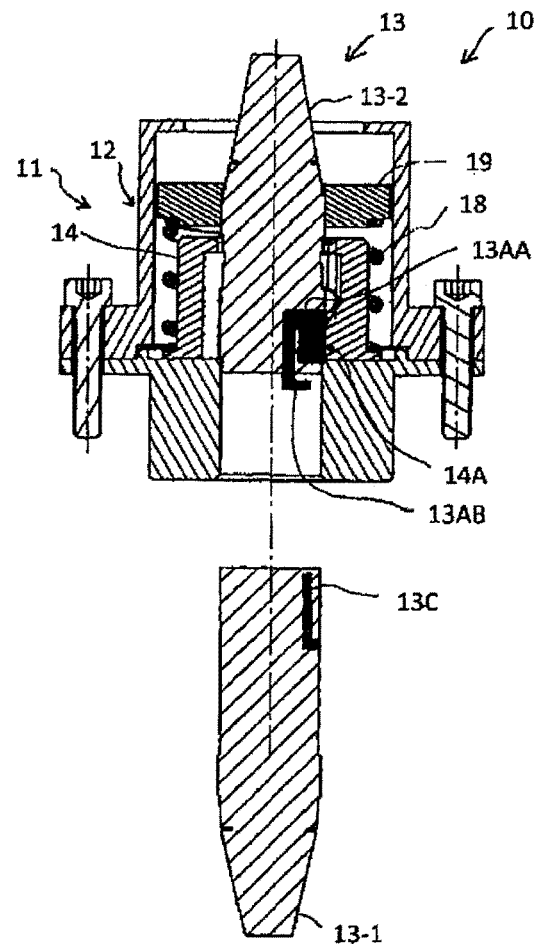
[Fig. 7]
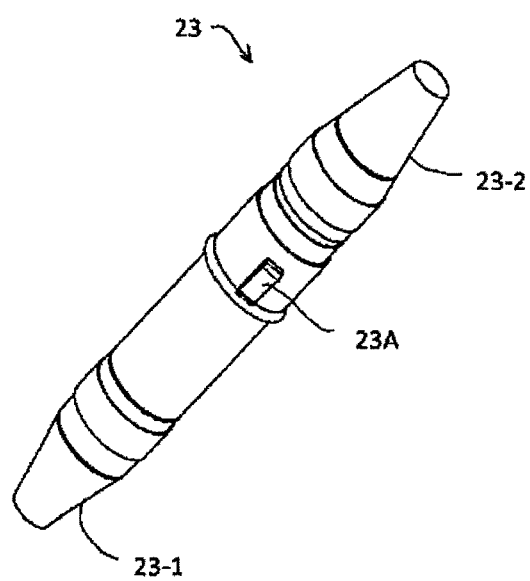

[Fig. 8]
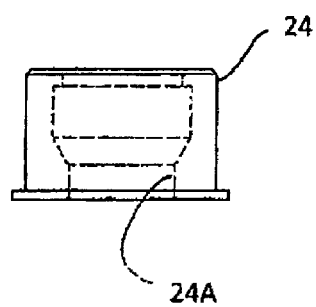
[Fig. 9]
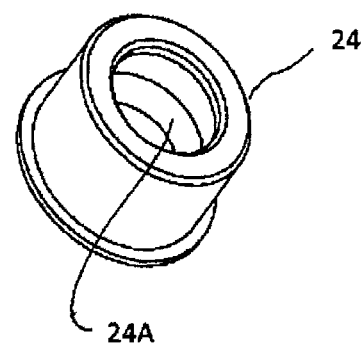

[Fig. 10]
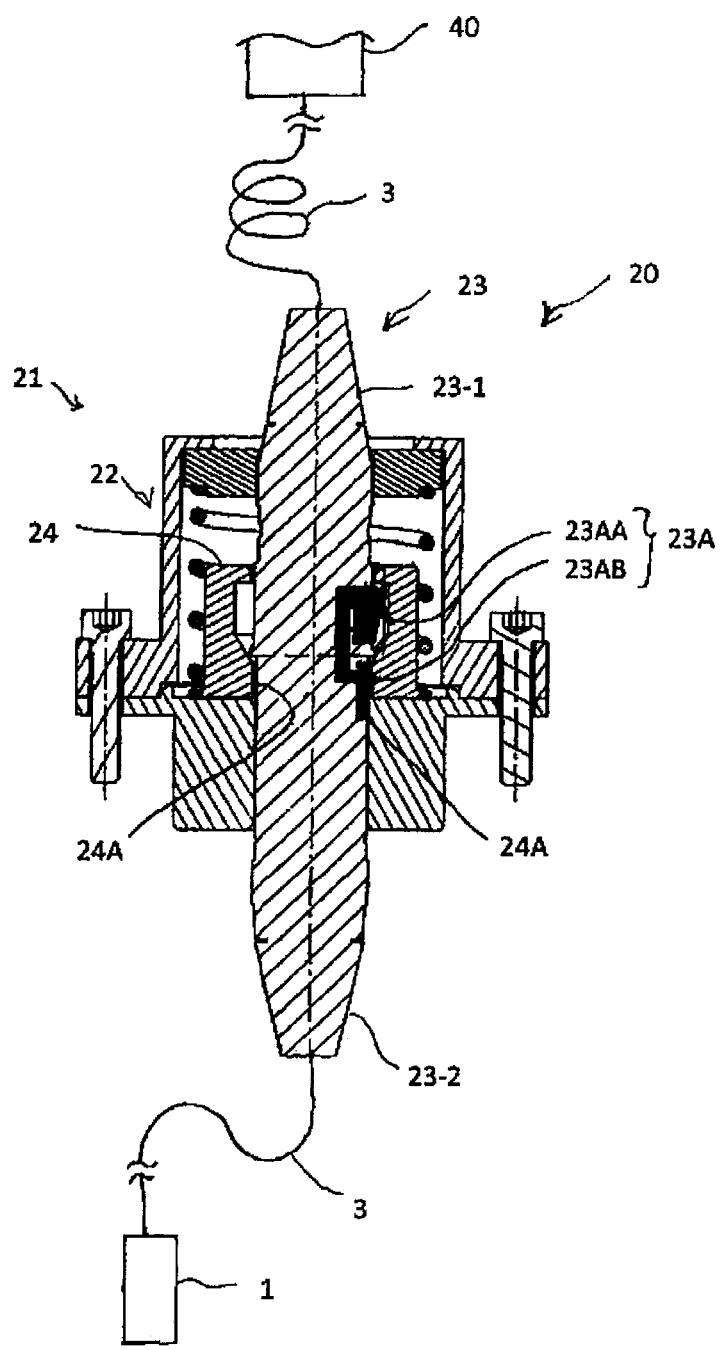

FLUID SUPPLY APPARATUS

CROSS-REFERENCE TO RELATED APPLICATIONS

The present application claims priority to Japanese Application No. 2018-125965 filed on Jul. 2, 2018, the disclosure of which is incorporated herein by reference.

STATEMENT RE: FEDERALLY SPONSORED RESEARCH/DEVELOPMENT

Not Applicable

BACKGROUND

1. Technical Field

The present invention relates to a fluid supply apparatus for supplying fluid (gas or liquid) including fuel such as hydrogen gas (H2) and gasoline to vehicles and others.

2. Description of the Related Art

For example, a vehicle using hydrogen as fuel, in a hydrogen filling station, fills hydrogen gas as a fuel fluid after a filling nozzle mounted on an end of a filling hose and a vehicle side filling port are connected with each other. During the filling, a photodetector mounted on the filling nozzle receives data such as pressure and temperature in a tank sent from the vehicle and sends them to a controller in a housing (hydrogen filling apparatus) through a signal line to properly perform the filling control.

Here, for example, when the filling hose is pulled due to a cause such as movement of a vehicle during filling operation, devices such as the filling nozzle and the filling hose may be broken, and hydrogen gas may jet, which may cause dangerous situations. Then, the present applicant proposed an emergency separation pipe joint that separates when more or equal to a predetermined tensile load is added thereto before.

The above emergency separation pipe joint is effective. However, since one signal line is used to connect the photodetector mounted on an end of the filling nozzle and the controller in a housing main body, when more or equal to a predetermined tensile load is added to the emergency separation pipe joint, and the joint is separated, the signal line is cut under the condition that conducting portions thereof are exposed, which may cause a serious accident due to short circuit, which is generated when the conducting portion contacts other metal portion, or contacts between sparks generated by the short circuit and hydrogen gas. Then, since hydrogen gas is large in buoyant force and high in diffusion velocity, the possibility that the hydrogen gas contacts sparks generated by the short circuit is not low. Further, every time the signal line is cut, portions of the signal line cut are different from each other, and it is difficult to anticipate the portion, so that it is difficult to utilize the cut signal line again. And, when the signal line is cut, there is a problem that it takes long time to restore it. In addition, when the signal line is not cut, the filling apparatus is pulled and fallen down, which may destroy the apparatus.

Other than the above pipe joint, another emergency separation pipe joint is, for example, described in Japanese Patent Publication No. 2007-120717. But, in the conventional art also, solution of the above problem on the cut of the signal line is not disclosed. And, since an emergency separation coupling 11 and a filling apparatus 1 are connected with each other through a hose 4A and both ends of the hose 4A are connecting portions, there is a problem that leakage risk becomes high due to increased number of connection portions. Further, at the separation, a moving pin 35 in a fitting member 29 on outflow side moves in relation to a seal ring 30B, so that the seal ring 30B is damaged or stuck, which leads to a disadvantage that leakage risk of hydrogen gas from the seal ring 30B becomes high.

The content of Japanese Patent Publication No. 2007-120717 is incorporated herein by reference in their entirety.

BRIEF SUMMARY

The present invention has been proposed in consideration of the above problems in the prior art, and the object thereof is to provide a fluid supply apparatus capable of preventing inconveniences cause by cut of the signal line when the filling hose is separated through the emergency separation pipe joint.

A fluid supply apparatus (100: fluid supply apparatus for supplying fluid such as hydrogen gas and gasoline) includes a supply system for transporting fluid such as hydrogen gas and gasoline in a housing main body while measuring flow rate of the fluid; a control mechanism for controlling the supply system; a hose (2) introduced from the supply system and having a nozzle (1) at an end thereof; and a signal line (3) along the hose (2), wherein the signal line (3) is detachable.

In the above invention, it is preferable that the signal line (3) includes a detachable portion (10, 20: signal line separation mechanism) as a separable portion, and the detachable portion (10, 20) is provided with a locking mechanism (11, 21). Further, it is preferable that to the locking mechanism (11, 21) is mounted an emergency separation mechanism (12, 22) for releasing the locking mechanism (11, 21).

In addition, it is preferable that the locking mechanism (11, 21) includes a signal line holding member (13, 23), to the signal line holding member (13, 23) is mounted a first convex portion (13A, 23A) for releasing engagement of the locking mechanism (11, 21), and the locking mechanism (11, 21) includes a lock releasing member (14, 24), and to the lock releasing member (14, 24) is mounted a second convex portion (14A, 24A) for releasing engagement of the locking mechanism (11, 21) by contacting the first convex portion (13A, 23A). Here, it is preferable that on both sides of the first convex portion (13A) of the signal line holding member (13) in a circumferential direction are formed detent projections (13B), and dimension of the second convex portion (14A) of the lock releasing member (14) in the circumferential direction is smaller than a gap between the detent projections (13B). Or, it is preferable that on both sides of the first convex portion (23A) of the signal line holding member (23) in a circumferential direction are not formed detent projections, and the second convex portion (24A) of the lock releasing member (24) is formed on a whole area of the lock releasing member (24) in a circumferential direction.

When carrying out the invention, it is preferable that the signal line (3) is mounted in loose state, and the signal line (3) is separated at the detachable portion (10, 20) after the hose (2) is separated.

With the present invention with the above construction, the signal line (3) is detachably mounted, and includes the detachable portion (10, 20) as a separable portion in the middle of the signal line (3), so that the signal line (3) separates at the same portion (the detachable portion (10, 20)). As a result, connecting the separated signal lines (3) at the detachable portion (10, 20) again certainly enables reuse of the signal line (3) with ease. Then, even when the signal line (3) separates, it can be easily restored to its original state before the separation. In addition, when more or equal to a predetermined tensile load is added, the signal line 3 separates at the detachable portion (10, 20), that is, the signal line 3 does not separate at an unspecified portion. Then, the separated signal line 3 is maintained in a condition that conductor portions thereof are not considerably exposed, which can prevent generation of spark due to exposure of the conductor portion of the separated signal line and a fear of contact with hydrogen gas with large buoyancy and high diffusion velocity. Further, since the signal line 3 separates at the detachable portion (10, 20) when more or equal to a predetermined tensile load is added, it can be prevented that the filling apparatus 40 is pulled and fallen down to be damaged.

In the present invention, when the signal line 3 is provided with the detachable portion (10, 20) and the detachable portion (10, 20) has the locking mechanism (11, 21), with the locking mechanism (11, 21), the separable signal lines are maintained in a condition that are connected at the detachable portion (10, 20). As a result, signals showing data such as pressure and temperature in a tank that are transmitted from the vehicle (50) are sent to the controller in the housing main body through the signal line 3, which performs proper filling operation.

In case that the locking mechanism (11, 21) is mounted to the detachable portion (10, 20), when the emergency separation mechanism (12, 22) is mounted to the locking mechanism (11, 21), at an emergency, for example, more or equal to a predetermined tensile load is added due to unexpected departure of a vehicle, separation of the signal line 3 can prevent cutting of the signal line 3 and inconvenience due to the cutting such as generation of sparks and contact between hydrogen gas and the sparks. Further, separation of the signal line 3 prevents that the filling apparatus 40 is pulled and fallen down to be damaged by a tensile force applied to the signal line 3.

BRIEF DESCRIPTION OF THE DRAWINGS

FIG. 1 is an explanatory drawing showing an outline of a fluid supply apparatus according to the first embodiment of the present invention;

FIG. 2 is a cross sectional view of a detachable portion of a signal line of the fluid supply apparatus, in which the signal line is connected and is fixed by a locking mechanism;

FIG. 3 is a perspective view showing a signal line holding member in the detachable portion;

FIG. 4 is a perspective view showing a lock releasing member in the detachable portion;

FIG. 5 is a cross sectional view showing a condition that a first convex portion of the signal line holding member is pressed by a second convex portion of the lock releasing member to separate the signal line;

FIG. 6 is a cross sectional view showing a condition that the signal line holding member is separated;

FIG. 7 is a perspective view showing a signal line holding member used in the second embodiment of the present invention;

FIG. 8 is a cross sectional view showing a lock releasing member used in the second embodiment of the present invention;

FIG. 9 is a perspective view showing the lock releasing member shown in FIG. 8; and FIG. 10 is a cross sectional view showing the detachable member of the signal line in the second embodiment, in which the signal line is connected and is fixed by the locking mechanism.

DETAILED DESCRIPTION

Hereinafter, embodiments of the present invention will be explained with reference to the attached drawings. In the embodiment shown in the drawings, a hydrogen dispenser for filling hydrogen gas to a vehicle is exemplified. At first, with reference to FIGS. 1 to 6, the first embodiment of the present invention is explained. In FIG. 1, a fluid supply apparatus 100 is provided with a supply system (not shown) for transporting hydrogen gas in a housing main body of a hydrogen dispenser 40 while measuring flow rate of the hydrogen gas; a control mechanism (not shown) for controlling the supply system. Then, to the supply system is connected a filling hose 2 with a filling nozzle 1 at an end thereof. In a vehicle 50 to which hydrogen is filled, the filling nozzle 1 at an end of the filling hose 2 and a filling spout not shown on the side of the vehicle 50 are connected with each other to fill hydrogen gas.

To the filling hose 2 is mounted an emergency separation pipe joint 30, and when more or equal to a predetermined tensile load is added to the emergency separation pipe joint 30, the pipe joint 30 is separated. For example, during filling of hydrogen gas, when the filling hose 2 is pulled when a vehicle moves for some reason, the emergency separation pipe joint 30 separates to separate the filling hose 2 into one on the hydrogen dispenser 40 side and another on the filling nozzle 1 (vehicle 50) side. With this, it is prevented that the hydrogen dispenser 40 falls down and is damaged to eject hydrogen gas, which is a dangerous situation.

In FIG. 1, along the filling hose 2 from the filling nozzle 1 on the hydrogen dispenser 40 side is mounted the signal line 3. On the filling nozzle 1 is mounted a photodetector not shown. The photodetector receives signals showing data such as pressure and temperature in a tank sent from a vehicle and sends them to a controller in a main body on the hydrogen dispenser 40 side through the signal line 3 to properly perform the hydrogen filling control. In the fluid supply apparatus according to the embodiment shown in the drawings, the signal line 3 has a detachable portion 10 (signal line separation mechanism) adjacent to the hydrogen dispenser 40. And, the signal line 3 is detachable at the detachable portion 10. The detachable portion 10 is provided with a locking mechanism 11 (shown in FIG. 2) described below, and to the locking mechanism 11 is mounted the emergency separation mechanism 12, which releases the locking mechanism 11 when more or equal to a predetermined tensile force is added.

For example, when more or equal to a predetermined tensile force is added to the signal line 3 during filling of hydrogen gas due to movement of a vehicle for some reason, the emergency separation mechanism 12 works to release the locking mechanism 11, and the detachable portion 10 is separated, which causes the signal line 3 to be separated into the hydrogen dispenser 40 side and the filling nozzle 1 side (the vehicle 50 side). As a result, the signal line 3 is not cut at an unspecified portion other than the detachable portion 10, inconveniences caused by the cut at an unspecified portion such as generation of sparks, contact between hydrogen gas and sparks and repair works for the signal line 3 are prevented. In addition, it is prevented that the hydrogen dispenser 40 is pulled and fallen down to be damaged by a tensile force acting on the signal line 3.

Detail of the detachable portion 10 (signal line separation mechanism) will be explained with reference to FIG. 2. In FIG. 2, whole of the detachable portion (signal line separation mechanism) is indicated by the numeral 10, and the detachable portion 10 is provided with a base member 15, a casing 16 and mounting bolts 17 for fixing the casing 16 to the base member 15. The base member 15 and the casing 16 have opening portions at central portions in radial directions (left and right directions), through the opening portions passes the signal line holding member 13 (refer to FIG. 3) in the shape of long and narrow rotating body. The signal line holding member 13 is, as shown in FIG. 6, separable into a nozzle side part 13-1 (the lower part in FIG. 6) and a dispenser side part 13-2 (the upper part in FIG. 6)

In FIG. 2, to the signal line holding member 13 is connected the signal line 3, and the signal line 3 is connected to the filling nozzle 1 and the hydrogen dispenser 40. Illustration of the signal line 3 is omitted in FIGS. 5 and 6. Here, a portion of the signal line 3 connected on the hydrogen dispenser 40 side (a portion connected to the dispenser side part 13-2 side) is loosened. As a result, when a tensile force (less than predetermined value) is added to the signal line holding member 13 through the signal line 3 connected to the filling nozzle 1, even though the signal line holding member 13 is pulled on the filling nozzle 1 side (even though it becomes the condition shown in FIG. 5), to the portion of the signal line 3 connected on the hydrogen dispenser 40 side is not added the tensile force. As shown in FIG. 2, when the nozzle side part 13-1 and the dispenser side part 13-2 of the signal line holding member 13 are connected with each other, the portion of the signal line 3 connected on the filling nozzle 1 side and the portion of the signal line 3 connected on the dispenser 40 side are, in the same manner as conventional art and goods on the market, maintained in an electrically connected condition.

As shown in FIGS. 2 and 3, to the dispenser side part 13-2 of the signal line holding member 13 is mounted the first convex portion 13A adjacent to a boundary with the nozzle side part 13-1 in an axial direction (up-and-down direction in FIG. 2), and to the first convex portion 13A is mounted a pressing portion 13AA and a locking portion 13AB. The pressing portion 13AA and the locking portion 13AB are clearly illustrated in FIGS. 5 and 6 also. As shown in FIG. 2, the first convex portion 13A usually projects from outside of the dispenser side part 13-2 in a circumferential direction, and pressing the pressing portion 13AA inwardly in a radial direction allows the first convex portion 13A to be embedded inwardly in a radial direction. As shown in FIG. 3, on both sides of the first convex portion 13A in a circumferential direction are formed the detent projections 13B.

To the nozzle side part 13-1 of the signal line holding member 13 is mounted a locked portion 13C adjacent to the boundary with the dispenser side part 13-2. The locked portion 13C is illustrated in FIGS. 5 and 6 also. Although not clearly illustrated, on the locked portion 13C is formed a channel for embedment into which the locking portion 13AB of the first convex portion 13A of the dispenser side part 13-2 is embedded, and when the first convex portion 13A projects outwardly in a radial direction of the dispenser side part 13-2 during a normal period, the channel for embedment and the locking portion 13AB engage with each other as shown in FIG. 2, and the nozzle side part 13-1 and the dispenser side part 13-2 are connected with each other. On the other hand, when the first convex portion 13A is pressed and is embedded inwardly in a radial direction, the engagement between the channel for embedment and the locking portion 13AB is released as shown in FIG. 5, and the engagement between the nozzle side part 13-1 and the dispenser side part 13-2 is released and they are separated from each other. Here, as the signal line holding member 13 can be used well-known products for example goods on the market.

The locking mechanism 11 of the detachable portion 10 includes the nozzle side part 13-1 to which the locked portion 13C is mounted, the dispenser side part 13-2 to which the first convex portion 13A is mounted, an emergency separation mechanism 12 described below for releasing engagement of the locking mechanism 11, the base member 15, the casing 16 and others. In FIG. 2, in the casing 16 is accommodated the lock releasing member 14, a spring (coil spring) 18 and a spring press plate 19. The lock releasing member 14 is mounted inside the spring 18 in a radial direction, and is formed in a hollow shape with an opening at a central portion in a radial direction. Through the opening portion of the lock releasing member 14 passes the dispenser side part 13-2, and in the hollow portion of the lock releasing member 14 is disposed the signal line holding member 13.

As shown in FIG. 4, the lock releasing member 14 is formed in a shape of a hollow body, and on the lock releasing member 14 are formed a second convex portion 14A projecting inward in a radial direction and a concave portion 14b described below. The second convex portion 14A is formed at a position corresponding to the first convex portion 13A of the dispenser side part 13-2 in a circumferential direction. In the lock releasing member 14, an area where the second convex portion 14A is formed and an area where the second convex portion 14A is not formed are connected with each other through a smoothly inclined portion (tapered portion) as shown in FIG. 2. In the second convex portion 14A, a projecting amount that projects inward in a radial direction is set as much as necessary and sufficiently, when by the second convex portion 14A is pressed the first convex portion 13A of the dispenser side part 13-2 inwardly in a radial direction, to release engagement between the first convex portion 13A and the locked portion 13C of the nozzle side part 13-1 and separate into the nozzle side part 13-1 and the dispenser side part 13-2.

The emergency separation mechanism 12 includes the lock releasing member 14 to which the second convex portion 14A is formed, the spring 18, the spring press plate 19 and others. In FIG. 2, the spring press plate 19 is fixed to the dispenser side part 13-2, and when the dispenser side part 13-2 moves in a longitudinal direction (axial direction, up-and-down direction in FIG. 2), the spring press plate 19 also moves in the longitudinal direction together with the dispenser side part 13-2. Here, FIG. 2 shows a condition that no tensile force is applied to the signal line 3 connected to the filling nozzle 1, so that the first convex portion 13A of the dispenser side part 13-2 positions opposite to the area where the second convex portion 14A of the lock releasing member 14 is not formed in a longitudinal direction (up-and-down direction in FIG. 2). As a result, the first convex portion 13A is not pressed inward in a radial direction, and the first convex portion 13A does not separate into the nozzle side part 13-1 and the dispenser side part 13-2, and they are integrally connected with each other to maintain a condition that the signal line 3 extends from the filling nozzle 1 to the hydrogen dispenser 40.

In FIG. 2, when a tensile force is applied to the signal line 3 connected to the filling nozzle 1, the tensile force acts on the dispenser side part 13-2 through the nozzle side part 13-1, which causes the dispenser side part 13-2 to move on the filling nozzle 1 side (downward in FIG. 2) and to move the spring press plate 19 downward also to compress the spring 18. When the tensile force acting on the signal line 3 is below a predetermined value, the first convex portion 13A of the dispenser side part 13-2 does not move (go down in FIG. 2) until an area where the second convex portion 14A of the lock releasing member 14 is formed. In that case, the spring press plate 19 moves downward to compress the spring 18, but as shown in FIG. 2, the spring press plate 19 does not reach to an upper face portion of the lock releasing member 14.

On the other hand, when the tensile force acting on the signal line 3 is more or equal to a predetermined value, as shown in FIGS. 5 and 6, the spring press plate 19 reaches to an upper face portion of the lock releasing member 14 to depress the dispenser side part 13-2, so that the first convex portion 13A moves downward (goes down in FIGS. 2, 5 and 6) to an area where the second convex portion 14A is formed through a tapered portion of the lock releasing member 14. As a result, the first convex portion 13A is pressed inward in a radial direction by the second convex portion 14A of the lock releasing member 14. The condition that the first convex portion 13A is pressed inward in a radial direction by the second convex portion 14A is shown in FIGS. 5 and 6.

As a result that the first convex portion 13A is pressed inward in a radial direction by the second convex portion 14A, as shown in FIG. 6, the nozzle side part 13-1 and the dispenser side part 13-2 are separated from each other. That is, action of the emergency separation mechanism 12 allows the locking mechanism 11 of the signal line holding member 13 to be released, which causes the nozzle side part 13-1 and the dispenser side part 13-2 to be separated from each other. Due to the separation of the nozzle side part 13-1 and the dispenser side part 13-2, the tensile force acting on the signal line 3 on the nozzle side is not transmitted to the signal line 3 on the dispenser 40 side, so that there is no fear that the tensile force causes the hydrogen dispenser 40 to fall down and to be damaged. Here, when the tensile force acting on the signal line 3 is more or equal to a predetermined value, the spring press plate 19 contacts an upper face portion of the lock releasing member 14, so that the dispenser side part 13-2 integrally connected to the spring press plate 19 does not move on the filling nozzle 1 side (downward in FIGS. 5 and 6) from the positions shown in FIGS. 5 and 6.

Although not clearly illustrated, elastic repulsive force of the spring 18 in the casing 16 is set in such a manner that amount of deformation of the spring 18 when a tensile force more or equal to a predetermined value acts on the signal line 3 is less or equal to a loosened amount of the signal line 3 on the hydrogen dispenser 40 side. Then, the amount of deformation of the spring 18 when a tensile force more or equal to a predetermined value acts is set to become an amount of movement (amount of fall in FIGS. 2 and 5) of the first convex portion 13A of the dispenser side part 13-2 toward an area where the second convex portion 14A of the lock releasing member 14 is formed. As a result, when the tensile force acting on the signal line 3 is more or equal to a predetermined value, as described above, the first convex portion 13A of the dispenser side part 13-2 moves (falls in FIGS. 2, 5 and 6) to the area where the second convex portion 14A of the lock releasing member 14 is formed to release the locking mechanism 11 of the signal line holding member 13, which causes the nozzle side part 13-1 and the dispenser side part 13-2 to separate from each other. On the other hand, when the tensile force acting on the signal line 3 is less than a predetermined value, the first convex portion 13A of the dispenser side part 13-2 does not move to the area where the second convex portion 14A of the lock releasing member 14 is formed, so that the locking mechanism 11 of the signal line holding member 13 is not released, which causes the nozzle side part 13-1 and the dispenser side part 13-2 not to be separated from each other.

With the embodiment illustrated in the drawings, after the nozzle side part 13-1 and the dispenser side part 13-2 are separated from each other (shown in FIG. 6), and after the tensile force acting on the signal line 3 on the filling nozzle 1 side is got dissipated, it is possible to return the state shown in FIG. 2. After the nozzle side part 13-1 and the dispenser side part 13-2 are separated from each other, when the tensile force acting on the signal line 3 of the filling nozzle 1 is got dissipated, the nozzle side part 13-1 is pressed to the dispenser side part 13-2. Due to the locking mechanism 11 of the signal line holding member 13, the nozzle side part 13-1 and the dispenser side part 13-2 are connected with each other again, and it returns to the condition that the filling nozzle 1 is electrically connected to the hydrogen dispenser 40 through the signal line 3 (the state shown in FIG. 2).

In FIG. 3, at both sides of the first convex portion 13A of the dispenser side part 13-2 of the signal line holding member 13 in a circumferential direction are formed a pair of detent projections 13B. The distance between the detent projections 13B (circumferential distance) is set slightly larger than the width, in a circumferential direction, of the second convex portion 14A of the lock releasing member 14. When more or equal to a predetermined value of tensile force is added to the signal line 3 on the filling nozzle 1 side, the detent projections 13B of the dispenser side part 13-2 move on the filling nozzle 1 side (downward in FIG. 2) while putting the second convex portion 14A of the lock releasing member 14 between them.

Engagement between the concave portion 14b shown in FIG. 4 and the detent projections 13B prevents relative movement between the lock releasing member 14 and the dispenser side part 13-2 in a circumferential direction. When the lock releasing member 14 and the dispenser side part 13-2 relatively move in a circumferential direction, and more or equal to a predetermined value of tensile force is added, positions of the first convex portion 13A and the second convex portion 14A in a circumferential direction are different from each other, so that the second convex portion 14A does not press the first convex portion 13A inward in a radial direction, which may cause a fear that the nozzle side part 13-1 and the dispenser side part 13-2 do not separate from each other. With the detent projections 13B, when the lock releasing member 14 and the dispenser side part 13-2 are caused not to relatively move in a circumferential direction, even when more or equal to a predetermined value of tensile force is added, situation that the nozzle side part 13-1 and the dispenser side part 13-2 do not separate from each other can be prevented. Separation of the nozzle side part 13-1 and the dispenser side part 13-2 allows separation of the signal line 3 into one on the nozzle side and another on the dispenser side, so that when more or equal to a predetermined value of tensile force is added, the signal line 3 always separate at the signal line holding member 13. As a result, it is prevented that the signal line 3 is cut at an unspecified portion and inconveniences resulting from the cut such as generation of sparks and contact between hydrogen gas and sparks.

In the fluid supply apparatus 100 according to the first embodiment shown in FIGS. 1 to 6, when more or equal to a predetermined value of tensile force is added to the signal line 3, the signal line 3 has the detachable portion 10 (signal line separation mechanism) in midway and is detachably mounted, so that the signal line 3 always separates at the detachable portion 10 and is not cut at an unspecified portion. Then, connecting the separated signal lines 3 at the detachable portion 10 again allows the condition before separation to easily and certainly be restored, and the separated signal lines 3 to be reused. In addition, the signal line 3 separates at the detachable portion 10, which prevents exposure of a conducting portion of the signal line 3, so that generation of sparks and contact between hydrogen gas and sparks due to the exposure of the conducting portion of the signal line 3 can be prevented. In addition, since the signal line 3 separates at the detachable portion 10 when more or equal to a predetermined value of tensile force is added, it is prevented that the hydrogen dispenser 40 is pulled and fallen down to be damaged.

In addition, in the fluid supply apparatus 100 according to the first embodiment, by the locking mechanism 11 of the detachable portion 10, separable signal lines are held at the detachable portion 10 under a condition that they are connected. Therefore, signals showing data transmitted from the vehicle 50 such as pressure and temperature in a tank are sent to a controlling device in the housing main body of the hydrogen dispenser 40 through the signal line 3 to perform proper filling control. Then, the locking mechanism 11 mechanically acts, resulting in secure and safe operation.

Further, in the fluid supply apparatus 100 according to the first embodiment, in the dispenser side part 13-2 are formed a pair of detent projections 13B on both sides of the first convex portion 13A in a circumferential direction, and in the lock releasing member 14 in an area where the second convex portion 14A is not formed, the detent projections 13B and the concave portion 14b abut with each other to form a detent for preventing relative movement between the lock releasing member 14 and the dispenser side part 13-2 in a circumferential direction. As a result, the second convex portion 14A of the lock releasing member 14 certainly presses the first convex portion 13A of the dispenser side part 13-2 inwardly in a radial direction.

Next, the second embodiment of the present invention will be explained with reference to FIGS. 7 to 10. In the first embodiment shown in FIGS. 1 to 6, as described above, a detent is formed in such a manner that the lock releasing member 14 and the signal line holding member 13 do not relatively move in a circumferential direction. On the other hand, in the second embodiment shown in FIGS. 7 to 10, even if the lock releasing member 14 and the signal line holding member 13 relatively move in a circumferential direction, the second convex portion 24A certainly presses the first convex portion 23A inward in a radial direction to separate the signal line holding member 23 into the nozzle side part 23-1 and the dispenser side part 23-2.

Although not clearly shown in FIG. 7, in the second embodiment also, the signal line holding member 23 is separable into the nozzle side part 23-1 and the dispenser side part 23-2. As clearly understood with FIG. 7, in the emergency separation mechanism 22 of the second embodiment, in the signal line holding member 23 (dispenser side part 23-2), no detent projection is formed on both sides of the first convex part 23A in a circumferential direction. Comparing the signal line holding member 23, the nozzle side part 23-1 and the dispenser side part 23-2 with the signal line holding member 13, the nozzle side part 13-1 and the dispenser side part 13-2 of the first embodiment, only that no detent projection is formed on both sides of the first convex part 23A is different.

On the other hand, in the lock releasing member 24 of the second embodiment, as shown in FIGS. 8 and 9, inside the lock releasing member 24, over the entire periphery, the second convex portion 24A is formed so as to inwardly project in a radial direction. In the detachable portion 20 of the signal line 3, a condition that the signal line 3 is connected and fixed by the locking mechanism 21 (corresponding to the condition shown in FIG. 2 in the first embodiment) is illustrated in FIG. 10. In FIG. 10, since the second convex portion 24A is formed over the entire periphery on the inner side of the lock releasing member 24, when more or equal to a predetermined value of tensile force is added to the signal line 3, regardless of relative positions of the lock releasing member 24 and the signal line holding member 23 in a circumferential direction, the second convex portion 24A of the lock releasing member 24 certainly presses the first convex part 23A of the dispenser side part 23-2 inward in a radial direction. As a result, the signal line holding member 23 separates into the nozzle side part 23-1 and the dispenser side part 23-2. Constructions and action effects of the second embodiment shown in FIGS. 7 to 10 other than the above are the same as those of the first embodiment shown in FIGS. 1 to 6.

Since the embodiments shown in the drawings are merely examples, and the embodiments do not limit the technical scope of the present invention. For example, in the embodiments shown in the drawings, although a hydrogen gas dispenser for filling hydrogen gas to a vehicle is exemplified, the present invention is not applied to the hydrogen gas dispenser only, but is applicable to feeding apparatuses for fuels such as gasoline to vehicles for instance.

DESCRIPTION OF THE REFERENCE NUMERALS 1 filling nozzle
2 filling hose
3 signal line
10, 20 detachable portions (signal line separation mechanisms)
11, 21 locking mechanisms
12, 22 emergency separation mechanisms
13, 23 signal line holding members
13A, 23A first convex portions
13B detent projection
14, 24 lock releasing members
14A, 24A second convex portions
100 fluid supply apparatus

What is claimed is:
1. A fluid supply apparatus for transporting fluid from a hydrogen dispenser while measuring and controlling a flow rate of the fluid, the fluid apparatus comprising:
    a hose introduced from the hydrogen dispenser and having a nozzle at an end thereof; and
    a signal line along the hose, wherein said signal line is detachable and includes a detachable portion as a separable portion, the detachable portion being provided with a locking mechanism which includes:
        a signal line holding member having a first convex portion mounted thereto; and
        a lock releasing member having a second convex portion mounted thereto for facilitating the release of the detachable portion of the locking mechanism by contacting the first convex portion.
2. The fluid supply apparatus as claimed in claim 1, wherein an emergency separation mechanism is mounted to release the locking mechanism to facilitate the selective release of the detachable portion thereof.

3. The fluid supply apparatus as claimed in claim 2, wherein on both sides of the first convex portion in a circumferential direction are formed detent projections, and dimension of the second convex portion in the circumferential direction is smaller than a gap between the detent projections.

4. The fluid supply apparatus as claimed in claim 2, wherein on both sides of the first convex portion in a circumferential direction are not formed detent projections, and the second convex portion is formed on a whole area of the lock releasing member in a circumferential direction.

5. The fluid supply apparatus as claimed in claim 1, wherein on both sides of the first convex portion in a circumferential direction are formed detent projections, and dimension of the second convex portion in the circumferential direction is smaller than a gap between the detent projections.

6. The fluid supply apparatus as claimed in claim 1, wherein on both sides of the first convex portion in a circumferential direction are not formed detent projections, and the second convex portion is formed on a whole area of the lock releasing member in a circumferential direction.

\* \* \* \* \*